Figure 1:
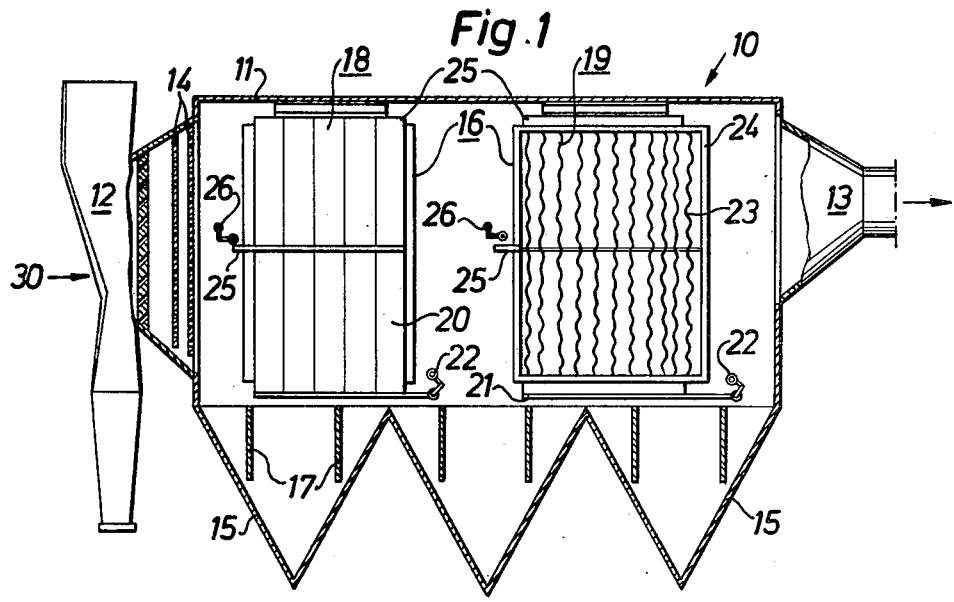

United States Patent [19]
Carlsson

[11] 4,443,234
[45] Apr. 17, 1984

[54] DEVICE AT A DUST FILTER
[75] Inventor: Kurt B. I. Carlsson, Växjö, Sweden
[73] Assignee: Fläkt Aktiebolag, Nacka, Sweden
[21] Appl. No.: 363,419
[22] Filed: Mar. 30, 1982
[30] Foreign Application Priority Data
  Mar. 4, 1982 [SE] Sweden ............................ 8102154
[51] Int. Cl.³ ......................... B03C 3/01; B03C 3/14; B01D 50/00
[52] U.S. Cl. ...................................... 55/126; 55/315; 55/324; 55/334; 55/338; 55/466
[58] Field of Search ................. 55/126, 324, 334, 320, 55/315, 338–340, 466

[56] References Cited
U.S. PATENT DOCUMENTS

| | | | |
|---|---|---|---|
| 1,928,702 | 10/1933 | O'Mara | 55/338 |
| 2,506,273 | 5/1950 | Linderoth | 55/338 |
| 2,712,858 | 7/1955 | Wintermute | 55/126 X |
| 2,779,468 | 1/1957 | King et al. | 55/315 X |
| 2,787,334 | 4/1957 | Linderoth | 55/126 |
| 3,083,516 | 4/1963 | Sayers | 55/338 |
| 3,378,994 | 4/1968 | Farr | 55/324 |
| 3,926,595 | 12/1975 | Bockman | 55/324 X |
| 4,227,903 | 10/1980 | Gustavsson et al. | 55/324 X |

FOREIGN PATENT DOCUMENTS
838676 5/1952 Fed. Rep. of Germany ........ 55/315
140780 6/1953 Sweden .

Primary Examiner—Kathleen J. Prunner
Attorney, Agent, or Firm—Dann, Dorfman, Herrell and Skillman

[57] ABSTRACT

This invention relates to a device at a dust filter for cleaning a gas flow from dust. The dust filter consists of an electrostatic precipitator or fabric filter (bag filter) and comprises a filter chamber (10) with gas inlet (12) and gas outlet (13). At the gas inlet a precollector (30) in the form of a louvre collector (31) is located for separating coarse dust, i.e. dust with a diameter exceeding 50–75 microns. In the order to obtain good collection at the louvre collector (31), the collected dust is evacuated by means of a partial gas flow, which is passed to a dust hopper (34) and a dust discharge unit (35). According to the invention, the dust discharge unit (35) comprises a cyclone collector (36), the inlet portion (37) of which is integrated with the dust hopper (34), and the outlet portion of which or central pipe (38) is formed with a passageway (39), the mouth (40) of which is located in the filter chamber downstream the louvre collector. The cyclone collector (36) is dimensioned so that the pressure drop over the louvre collector (31) amounting dimensioned so that the pressure drop over the louvre collector (31) amounting to between 0.0015 and 0.0030 atm is sufficient to drive the partial gas flow through the cyclone collector, which may be an axial cyclone or a tangential cyclone.

7 Claims, 6 Drawing Figures

DEVICE AT A DUST FILTER

This invention relates to a device in a dust filter having a precollector for separating coarse dust in advance of the filter unit.

High-capacity filters, such as electrostatic precipitators and fabric filters (for example bag filters), yield a very good collection of the fine dust fraction in a dust spectrum, but the collection of coarser dust, i.e. dust exceeding 50–75 microns, involves certain difficulties. At electrostatic precipitators, for example, the coarse dust can imply that the entire electrostatic precipitator must be overdimensioned in order to effect a desired total collection. When flue gases from coal-fired power stations are to be cleaned, the coarse dust in the flue gas includes large contents of uncombusted coal, which implies a certain fire hazard when the coal is to be collected in the electrostatic precipitator. This problem is especially accentuated at the combustion of brown coal. It is therefore, desired to pass the flue gas through a mechanical precollector before subjecting the flue gas to additional cleaning in the electrostatic precipitator.

As a precollector normally a louvre collector of some kind is used which is located at the inlet to the filter chamber. One characteristics of the louvre collector is that it collects coarse dust relatively efficiently and at the same time also contributes to a favourable distribution of the gas prior to its feeding into the filter chamber. In Swedish Pat. No. 140 780 such an application of a louvre collector or so-called dynamic filter is described. The coarse dust is collected from the gas flow in the louvre collector and removed by means of a partial gas flow to a dust hopper, from which the dust is discharged by means of a conveyor. It was found, however, that at the device described the partial gas flow includes a very high dust content, so that the partial gas flow cannot be introduced into the filter chamber, but must be returned to the main gas flow. Besides, the discharge of dust from the dust hopper gives rise to problems with respect to re-whirling of the dust in the gas flow, which results in a low efficiency of the precollector. It was, therefore, proposed to pass the partial gas flow through a separate cleaning circuit comprising cyclone collector, circulation fan and associated ducts in order to clean the flow from its high dust content. Such a separate circuit, however, is expensive both to install and operate.

The present invention has the object to overcome the aforesaid drawbacks. This object is achieved according to the invention by a device as defined in the characterizing clause of attached claim 1. Expedient embodiments become apparent from the subclaims. The integrated unit louvre collector and cyclone precipitator yields the gain, that the collection by the louvre collector, owing to the efficient discharge of the separated dust, can be utilized at optimum, and that at the same time the partial gas flow in the cyclone precipitator is cleaned substantially completely from the coarse dust and, thus, can be introduced directly into the filter chamber. This yields the double effect that the pressure drop over the louvre collector can be utilized for driving the partial gas flow through the cyclone precipitator. Owing to the invention, thus, seen on the whole a very efficient collection of the coarse dust is obtained, and the device rendering this possible requires little space, is inexpensive to install and reliable in operation.

Figure 2:
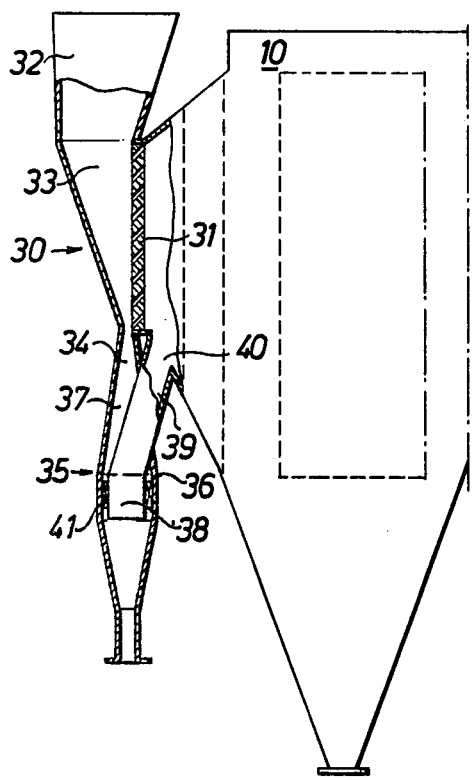
Figure 3:
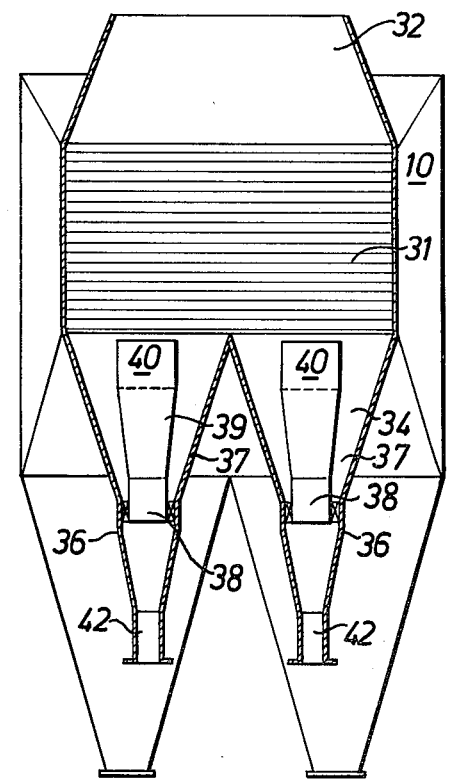
Figure 4:
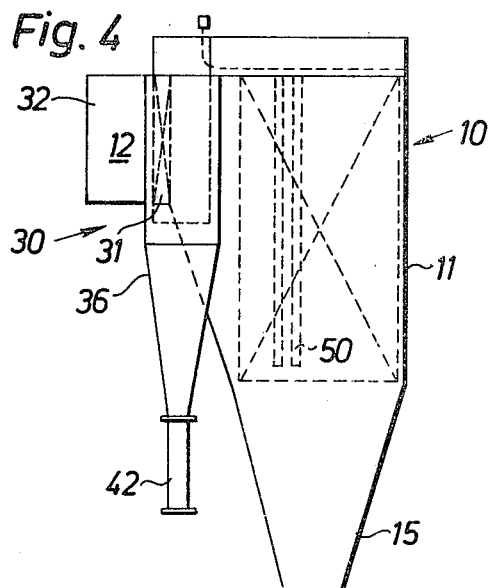
Figure 5:
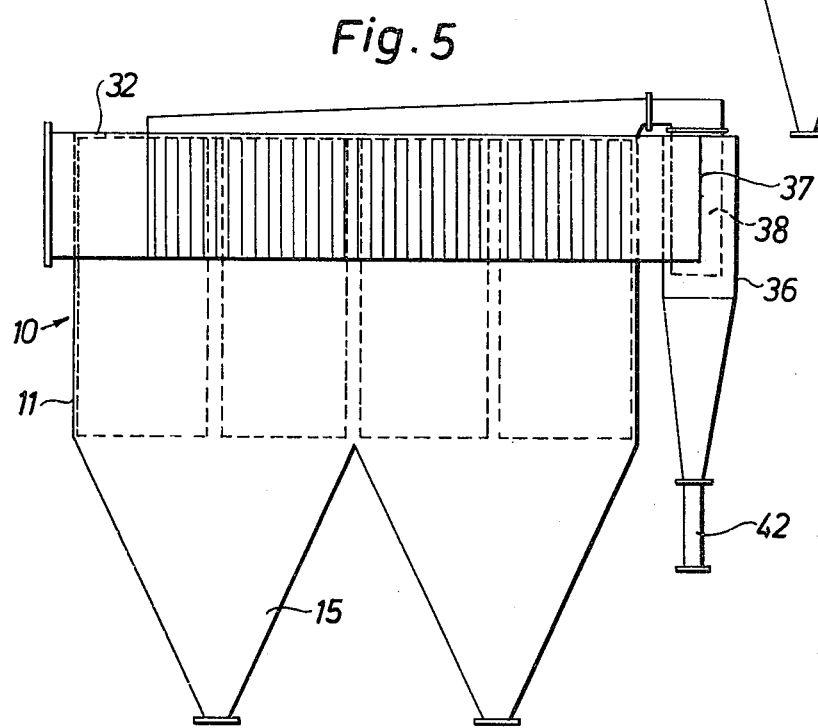
Figure 6:
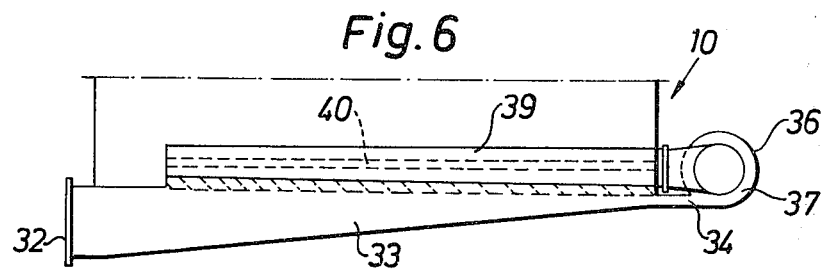

The invention is described in greater detail in the following, with reference to the accompanying drawings, in which FIG. 1 is a lateral view of an electrostatic precipitior, FIG. 2 shows in detail the inlet to the electrostatic precipitatior, FIG. 3 is a front view of the same inlet, FIG. 4 is a lateral view of a fabric filter, FIG. 5 is a front view of the same fabric filter, and FIG. 6 is a view from above on the gas inlet to the fabric filter.

FIG. 1 shows the invention in connection to a dust filter where the filter unit is an electrostatic precipitator. The dust filter comprises a filter chamber 10 with a casing 11, a gas inlet 12 for dust-laden gas and a gas outlet 13 for filtered gas. At the inlet end of the filter perforated gas distributors 14 are located, and at the bottom of filter units 16 dust hoppers 15 for collecting dust collected in the filter unit are located. Filter units, thus, are electrostatic precipitators. The dust is removed from the hoppers 15 intermittently or continuously by suitable means (not shown). In the upper portion of the hoppers 15 transverse baffles 17 are arranged so as to prevent flow of dust-laden gas in the longitudinal direction of the filter adjacent the bottom of the filter casing 11.

The filter is divided into two filtering sections 18 and 19, each of which is divided into a plurality of parallel passageways by means of vertical plates, which are substantially uniformly distributed over the width of the filter, and which in their turn each are formed of a plurality of substantially plate-shaped collecting electrodes 20 arranged in rows. The collecting electrodes 20 in each row are suspended upwardly in the upper portion of the casing 11 and are grounded via the same. The collecting electrodes 20 in each row are downwardly interconnected by a bar 21, against one end of which a rapping mechanism 22, shown schematically, can be caused to act in order to clean the collecting electrodes 20 by rapping. Each rapping mechanism at the embodiment shown is assumed to consist in conventional manner of a transverse rotatable axle, on which a plurality of radial arms are attached each directly in front of its bar 21. The arms form angles with each other and carry at their outer end pivotally an additional arm, which at itsfree end carries a weight. This arrangement operates in such a way that said additional arms, upon rotation of the axle in clockwise direction, one after the other are pivoted down with their weight against the end of the associated bar 21 and clean the collecting electrodes 20 connected to the bar in question by rapping.

In each passageway between the collection electrodes a plurality of discharge electrodes 23 in the form of spiral extending wires are provided, which extend substantially vertically between horizontal members in a frame work 24. The frame works 24 with the electrodes 23 in each filering section 18 or 19 are interconnected by additional frame structure 25 and suspended (in a way not shown) in the electrostatic precipitator casing electrically insulated therefrom. To the discharge electrodes 23, via the frame structure 24, 25, a high voltage is applied, which charges electrostatically the dust in the dust-laden gas, which dust thereby migrates to and precipitates on the collecting electrodes 20. As indicated at 26, the emission systems formed of the discharge electrodes with associated frame structure also are provided with rapping mechanisms for cleaning the same by rapping. The dust filter is provided via the gas inlet 12 with precollector 30 for collecting coarse dust from the gas flow prior to its passing thorough the filter unit 16. Coarse dust in this connection is to be understood as dust preferably with a particle size exceeding 50–75 microns, which gives rise to difficulties if it is to be collected in the electrostatic precipitator, the optimum collection capacity is for dust of a finer fraction.

In FIG. 2 are shown in detail the gas inlet 12 and associated precollector 30, which is designed in known manner as a louvre collector 31 consisting of louvres positioned obliquely in the gas flow direction. The gas thus is forced, after the connecting section 32 and inlet funnel 33, to perform a deflecting movement when it is to enter the filter chamber, whereby the coarse particles are separated from the gas flow and collected in the dust hopper 34 of the precollector, at the bottom of which a dust discharging unit 35 is located. According to the invention, the dust discharging unit comprises a cyclone collector 36, the inlet portion 37 of which is integrated with the dust hopper 34, and the central pipe 38 of which for the partial gas flow flowing through the cyclone is designed as a passageway 39, the mouth 40 of which is located in the filter chamber 10 downstream the louvre collector 31. The cyclone is provided with a guide vane unit 41 in the annular gap between the central pipe 38 and the casing of the cyclone. The cyclone is dimensioned for a flow amounting to between 4 and 10% of the total flow. This is sufficient to ensure an efficient removal of the dust collected in the louvre collector. The pressure drop obtained at the louvre collector with the gas passes the same is utilized for driving the partial gas flow through the cyclone collector, which, thus, is dimensioned for corresponding relatively low pressure drops, which preferably may amount to between 0.0015 and 0.0030 atm. In the cyclone collector substantially 100% of the dust is separated in the partial gas flow, which dust thus consists of the coarse dust separated from the precollector. In the filter chamber then an additional cleaning of the partial gas flow is carried out, after the partial gas flow was admixed to the main gas flow. The dust separated in the cyclone separator is collected in the bottom portion thereof where a discharge sluice 42 is located and discharges the dust in conventional manner. This discharge can be carried out as dry or as wet discharge.

FIG. 3 is a front view of the inlet side of the electrostatic precipitator shown in FIG. 2 and the dust discharging unit of the precollector consists of two cyclone collectors located side by side, each collector integrated with a dust hopper 34.

In FIGS. 4, 5 and 6 the invention is shown in connection to a dust filter, the filter unit of which is a fabric filter. FIG. 4 is a lateral view, while FIG. 5 is a front view, and FIG. 6 is a view from above on the gas inlet. The dust filter, like the dust filter described above, comprises a filter chamber 10 with a casing 11, a gas inlet 12 for dust-laden gas and a gas outlet (not shown) for filtered gas. The filter unit, i.e. the fabric filter, consists of a great number of filter gas 50 arranged in a plurality of rows. The gas to be cleaned penetrates the filter material whereby the dust in the gas precipitates on the filter surface. The filter bags are cleaned from the dust by means of a suitable cleaning process. Mostly the filter bags are cleaned by compressed air pulses, reverse air blowing or shaking. At the cleaning, the dust drops down into the dust hoppers 15 and is removed in a suitable way.

The gas to be cleaned is supplied to the inlet 12 of the dust filter in a horizontal gas flow, which first via the connecting section 32 is distributed over the entire length of the louvre collector by means of the inlet funnel 33 (FIG. 6) tapering in the gas direction. The coarse dust is separated at the deflection in the louvre collector 31 and concentrated to a small gas flow, which via the dust hopper 34 of the precollector 30 is passed in a cyclone collector 36, the inlet portion 37 of which according to the invention is integrated with the dust hopper 34, and the central pipe 38 of which for the partial gas flow flowing through the cyclone is designed as a passageway 39, the mouth 40 of which is located in the filter chamber 10 downstream the louvre collector 31.

The cyclone collector at this embodiment consists of a tangential cyclone with a vertical axle, formed with a narrow and high inlet 37 adjusted to the height of the louvre collector 31. The collected dust is discharged in a suitable way from a discharge sluice located at the bottom portion of the cyclone. The passageway 39 is formed with a distribution passageway, which is provided with a slit constituting the mouth 40, which here extends along the entire length of the louvre collector 31. Hereby a uniform return of the cleaned partial gas flow is obtained.

The invention is set forth additionally with reference to an embodiment, which relates to an installation for the separation of dust from the flue gas of a brown coal fired power station boiler. The flue gas is here passed to six filter units, of which the design of one is described in the following. The flue gas flows from above the air preheater to the boiler in a vertical flow at an amount of about 60 m$^3$/s and a rate of 12–20 m/s. By the connecting section 32 the rate in the inlet funnel is adjusted to 8–15 m/s, depending on the desired separation, pressure drop etc. In the deflection at the louvre collector 31 the large particles are separated, i.e. particles with a diameter exceeding 50 to 75 microns. The separation is efficient, and the cleaned gas, which depending on the particle distribution includes 60–80% of the original dust content, passes the louvre collector. Thereafter the gas passes the gas distribution screen 14 and the filter unit, which is an electrostatic precipitator, in which the fine dust is separated and removed in usual manner.

The louvre collector 31 operates as a concentrator, i.e. the coarse dust is concentrated to a low gas flow, which, for rendering possible efficient operation of the lourve collector, must be evacuated continuously through the dust discharging unit of the precollector. In this case, 6–8% of the original gas flow are evacuated together with the coarse dust, and the evacuated gas flow is divided into two partial gas flows, each of which passes an axial cyclone. The cyclones are formed with a ring gap, while their casing and central pipe and the gap are provided with guide vanes 41 for imparting to the gas a tangential speed component in the cyclone. The cyclone is dimensioned according to the pressure drop over the louvre collector corresponding to about 0.0025 atm. The cleaned secondary gas, i.e. the partial gas flow, is returned to the main gas flow via the central pipe 38 and the passageway 39 and its mouth 40 where the rate of the gas is so low, that the partial gas flow can be admixed to the main gas flow by simple means.

The louvre collector has a width of about 7 m and a height of 3 m, while the cross-section of the electrostatic precipitator i.e. its front surface, has the dimension 8 × 8 m$^2$. In the two cyclones, about 200 kg of dust are calculated to be collected per hour, and the collected dust consists substantially of sand and uncombusted particles. Owing to the invention, a simple, efficient and reliable procollector is obtained, which renders it possible to substantially reduce the size of the electrostatic precipitator.

I claim:

1. A device at a dust filter for cleaning a gas flow from dust, which dust filter comprises a filter chamber (10) with a gas inlet (12) and a gas outlet (13) and a filter unit (16) located in the filter chamber, which gas inlet (12) is provided with a precollector (30) for separating coarse dust from the gas flow prior to the passing of the gas flow through the filter unit, which precollector (30) is designed as a louvre collector (31) having at least one dust hopper (34) and dust discharge unit (35) located to collect and remove dust separated by the louvre collector by means of a partial gas flow, characterized in that the dust discharge unit (35) comprises a cyclone collector (36), the inlet portion (37) of which is integrated with the dust hopper (34), and the gas outlet portion of which for the partial gas flow flowing through the cyclone is designed as a passageway (39) having a mouth (40) which is located in the filter chamber (10) downstream from the louvre collector (31), and that the cyclone collector (36) is dimensioned so as to impart to the partial gas flow a pressure drop, which corresponds to the pressure drop of the gas flow through the louvre collector.

2. A device as defined in claim 1, characterized in that the cyclone collector (36) is an axial cyclone.

3. A device as defined in claim 1, characterized in that the cyclone collector (36) is a tangential cyclone.

4. A device as defined in any one of claim 1-3, dimensioned characterized in that the cyclone collector (36) is dimensioned to impart to the partial gas flow through the same a pressure drop amounting to between 0.0015 and 0.0030 atm.

5. A device as defined in claim 1, characterized in that the filter unit (16) consists of an electrostatic precipitator 6. A device as defined in claim 1, characterized in that the filter unit (16) consists of a fabric filter.

7. A device as defined in claim 1, characterized in that the cyclone collector (36) is dimensioned for a partial gas flow amounting to between 4 and 10%, preferably 6-8%, of the gas flow.

* * * * *